United States Patent
Noh et al.

(10) Patent No.: US 10,320,493 B2
(45) Date of Patent: Jun. 11, 2019

(54) APPARATUS REMOVING SELF-INTERFERENCE IN ENVIRONMENT SUPPORTING FDR METHOD

(71) Applicant: LG ELECTRONICS INC., Seoul (KR)

(72) Inventors: Kwangseok Noh, Seoul (KR); Dongkyu Kim, Seoul (KR); Hyunsoo Ko, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/559,256

(22) PCT Filed: Mar. 18, 2016

(86) PCT No.: PCT/KR2016/002770
§ 371 (c)(1),
(2) Date: Sep. 18, 2017

(87) PCT Pub. No.: WO2016/148540
PCT Pub. Date: Sep. 22, 2016

(65) Prior Publication Data
US 2018/0083717 A1    Mar. 22, 2018

Related U.S. Application Data

(60) Provisional application No. 62/135,182, filed on Mar. 19, 2015.

(51) Int. Cl.
*H04B 15/02*    (2006.01)
*H04B 1/54*    (2006.01)
(Continued)

(52) U.S. Cl.
CPC .............. *H04B 15/02* (2013.01); *H04B 1/525* (2013.01); *H04B 1/54* (2013.01); *H04W 52/04* (2013.01)

(58) Field of Classification Search
None
See application file for complete search history.

(56) References Cited

U.S. PATENT DOCUMENTS

| 2013/0114468 A1 | 5/2013 | Hui et al. |
| 2014/0233669 A1 | 8/2014 | Aggarwal et al. |

(Continued)

FOREIGN PATENT DOCUMENTS

WO    2014/190088 A1    11/2014

*Primary Examiner* — Hicham B Foud
(74) *Attorney, Agent, or Firm* — Birch, Stewart, Kolasch & Birch, LLP

(57) ABSTRACT

An apparatus for removing self-interference in an environment supporting an FDR method according to the present invention may comprise: an analog self-interference removal unit that is constructed to remove a first analog self-interference by subtracting a self-interference signal received through a first delay circuit connected between an RF transmission chain and an RF reception chain of the apparatus from a self-interference signal received at a first circuit of the RF reception chain of the apparatus, and that is constructed to remove a second analog self-interference by subtracting a self-interference signal received through a second delay circuit connected between the RF transmission chain and the RF reception chain of the apparatus from a self-interference signal received at a second circuit of the RF reception chain of the apparatus; and a processor that is constructed to determine whether the first and the second analog self-interference removals were respectively successful on the basis of the respective residual self-interference signals that are left after removing the first and the second analog self-interferences.

11 Claims, 7 Drawing Sheets

(51) Int. Cl.
*H04W 52/04* (2009.01)
*H04B 1/525* (2015.01)

(56) References Cited

U.S. PATENT DOCUMENTS

| | | | |
|---|---|---|---|
| 2014/0348018 A1* | 11/2014 | Bharadia | H04L 5/1461 370/252 |
| 2015/0049834 A1 | 2/2015 | Choi et al. | |
| 2015/0156003 A1* | 6/2015 | Khandani | H04L 5/143 370/278 |

* cited by examiner

APPARATUS REMOVING SELF-INTERFERENCE IN ENVIRONMENT SUPPORTING FDR METHOD

CROSS REFERENCE TO RELATED APPLICATIONS

This application is the National Phase of PCT International Application No. PCT/KR2016/002770, filed on Mar. 18, 2016, which claims priority under 35 U.S.C. 119(e) to U.S. Provisional Application No. 62/135,182, filed on Mar. 19, 2015, all of which are hereby expressly incorporated by reference into the present application.

TECHNICAL FIELD

The present invention relates to a wireless communication system, and more particularly, to an apparatus for performing self-interference cancellation (SIC) in an environment supporting a full duplex radio (FDR) scheme.

BACKGROUND ART

A full duplex radio (FDR) or full duplex communication scheme means a communication scheme for enabling a user equipment to simultaneously perform transmission and reception using the same resource. In this case, the same resource means the same time and frequency. FDR communication or full duplex communication can be referred to as two-way communication.

FIG. 1 is a conceptual diagram illustrating a user equipment (UE) and a base station (BS) that support FDR.

Referring to FIG. 1, there are three types of interferences in a network that supports the FDR. The first one is intra-device self-interference. The intra-device self-interference means that a signal transmitted from a transmit (Tx) antenna of a BS or UE is received by a receive (Rx) antenna of the BS or UE, thereby acting as interference. Since the signal transmitted from the TX antenna is transmitted with high power and a distance between the TX antenna and the RX antenna is relatively short, the signal is received at the RX antenna with almost no power loss. Thus, receive power of the signal is much higher than that of a desired signal. The second one is UE-to-UE inter-link interference. When a network supports the FDR, the UE-to-UE inter-link interference is increased. Specifically, if an uplink signal transmitted by a UE is received by an adjacently located UE, the uplink signal may act as interference to the adjacently located UE. This type of interference is referred to as the UE-to-UE inter-link interference. The third one is BS-to-BS inter-link interference. Similar to the UE-to-UE inter-link interference, the BS-to-BS inter-link interference is also increased when a network supports the FDR. If signals transmitted between BSs or heterogeneous BSs (e.g., pico, femto, relay, etc.) in a HetNet situation are received by an RX antenna of another BS, the signals may act as interference to another BS. This type of interference is referred to as the BS-to-BS inter-link interference.

Among the three types of interference, the intra-device self-interference (hereinafter referred to as self-interference) occurs only in the FDR. Thus, problems caused by the self-interference should be solved to efficiently manage the FDR system.

DISCLOSURE OF THE INVENTION

Technical Task

One object of the present invention is to provide a method for adaptively performing self-interference cancellation (SIC) at a radio frequency (RF) end of an apparatus supporting a full duplex radio (FDR) scheme.

Another object of the present invention is to provide an apparatus for performing SIC adaptively as well as supporting an FDR scheme.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In an aspect of the present invention, provided herein is an apparatus for performing self-interference cancellation (SIC) in an environment supporting a full duplex radio (FDR) scheme, including: an analog SIC unit configured to perform first analog SIC by subtracting a self-interference (SI) signal received through a first delay circuit connected between radio frequency (RF) transmission and reception chains of the apparatus from an SI signal received at a first circuit of the RF reception chain of the apparatus and to perform second analog SIC by subtracting an SI signal received through a second delay circuit connected between the RF transmission and reception chains of the apparatus from an SI signal received at a second circuit of the RF reception chain of the apparatus; and a processor configured to determine whether the first analog SIC is successful based on a residual SI signal remaining after performing the first analog SIC and determine whether the second analog SIC is successful based on a residual SI signal remaining after performing the second analog SIC.

The apparatus may further include an SI signal generation unit configured to generate a signal for the SIC. In this case, the SI signal generation unit may further include the first and second delay circuits. In addition, when it is determined that both the first and second analog SIC fails, the SI signal generation unit may be configured to apply a new attenuation coefficient value to the first and second delay circuits by changing a previously applied attenuation coefficient value for reference signal transmit power.

The apparatus may further include an SI signal generation unit configured to generate a signal for the SIC. In this case, the SI signal generation unit may further include the first and second delay circuits. In addition, when different attenuation coefficient values with respect to the same reference signal transmit power are respectively applied to the first and second delay circuits and when it is determined that only the first analog SIC of the first and second analog SIC is successful, the SI signal generation unit may be configured to apply an attenuation coefficient value applied to the first delay circuit in generating an SI signal of the first delay circuit later.

Each of the first and second delay circuits may include a first attenuator for performing antenna SIC, a second attenuator for applying an attenuation coefficient value corresponding to reference signal transmit power, and a third attenuator for a delay at a delayer and the RF reception chain. In this case, a delay value of the delayer included in the first delay circuit may be different from that of the delayer included in the second delay circuit. Each of the first and second delay circuits may be connected in parallel to the RF transmission and reception chains. On the other hand, an attenuation coefficient value of the first attenuator included in the first delay circuit may be equal to that of the first attenuator included in the second delay circuit.

In another technical aspect of the present invention, provided herein is a method for performing self-interference cancellation (SIC) by an apparatus supporting a full duplex radio (FDR) scheme, including: performing first analog SIC by subtracting a self-interference (SI) signal received through a first delay circuit connected between radio frequency (RF) transmission and reception chains of the apparatus from an SI signal received at a first circuit of the RF reception chain of the apparatus; performing second analog SIC by subtracting an SI signal received through a second delay circuit connected between the RF transmission and reception chains of the apparatus from an SI signal received at a second circuit of the RF reception chain of the apparatus; and determining whether the first analog SIC is successful based on a residual SI signal remaining after performing the first analog SIC and whether the second analog SIC is successful based on a residual SI signal remaining after performing the second analog SIC.

The method may further include, when it is determined that both the first and second analog SIC fails, applying a new attenuation coefficient value to the first and second delay circuits by changing a previously applied attenuation coefficient value for reference signal transmit power.

The method may further include, when different attenuation coefficient values with respect to the same reference signal transmit power are respectively applied to the first and second delay circuits and when it is determined that only the first analog SIC of the first and second analog SIC is successful, performing the analog SIC based on an attenuation coefficient value applied to the first delay circuit. The method may further include applying a new attenuation coefficient value corresponding to changed reference signal transmit power to the second delay circuit. In this case, whether the first analog SIC is successful may be determined based on whether the residual SI signal remaining after the first analog SIC passes through an analog-to-digital converter (ADC) and whether the second analog SIC is successful may be determined based on whether the residual SI signal remaining after the second analog SIC passes through the ADC.

Advantageous Effects

According to the present invention, it is possible to not only perform SIC rapidly but also stabilize SIC performance.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
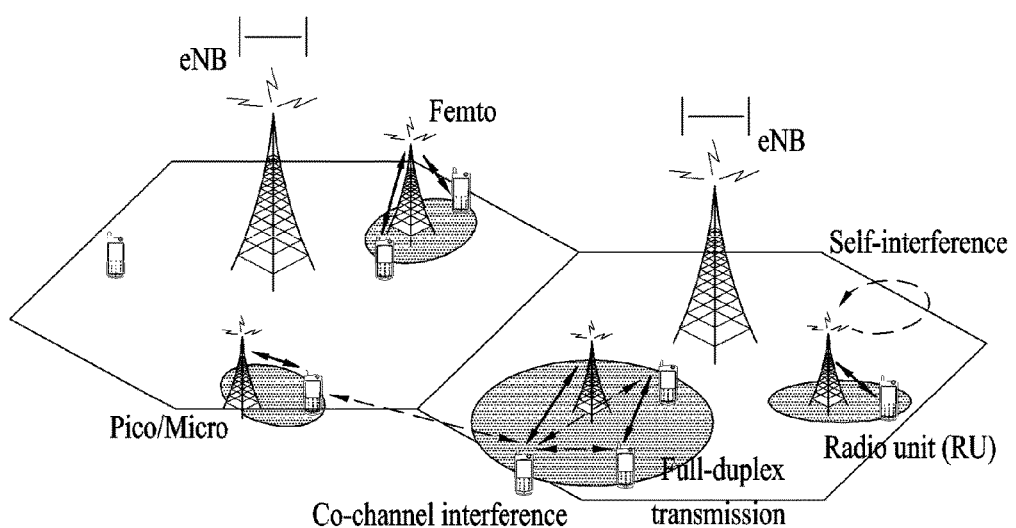
FIG. 1 is a conceptual diagram illustrating a user equipment (UE) and a base station (BS) that support FDR.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
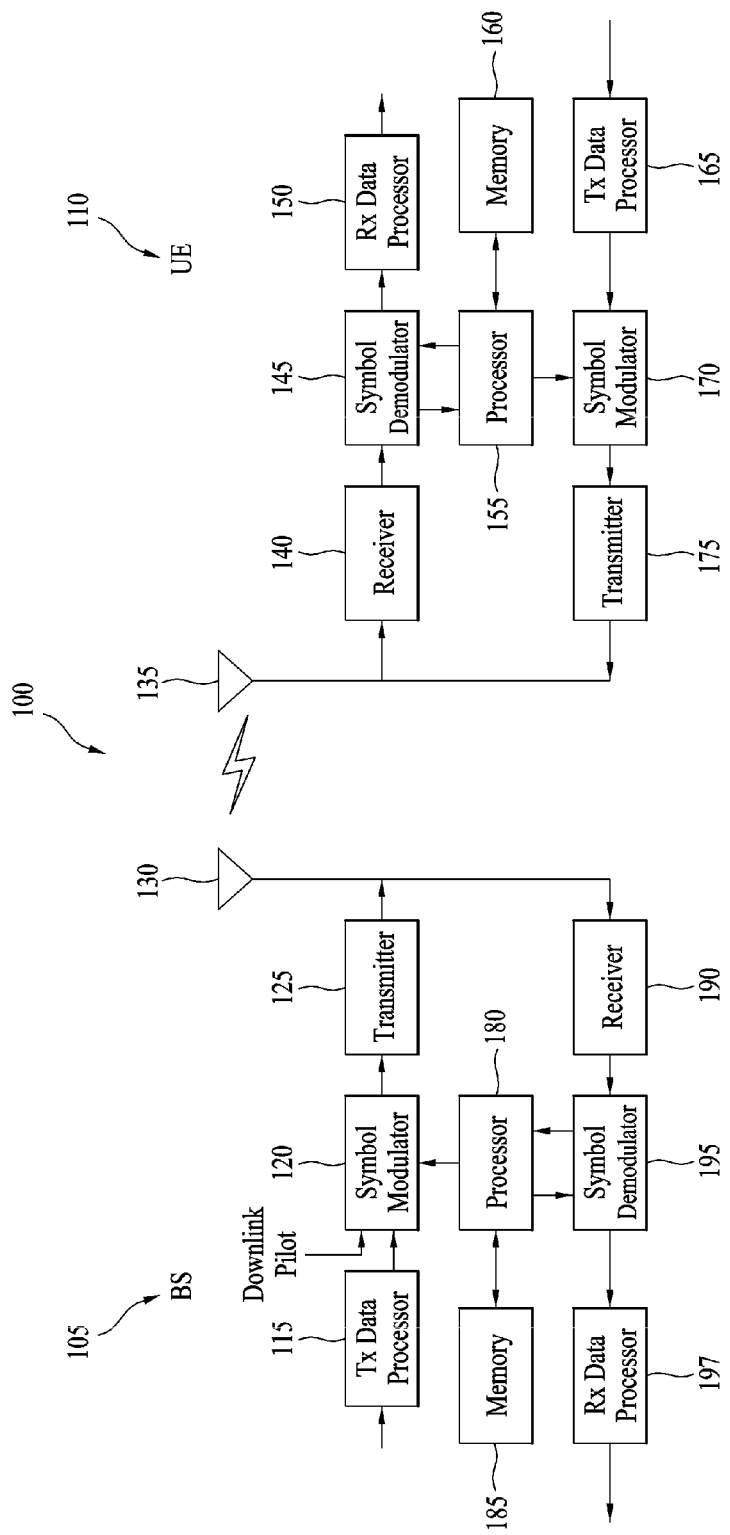
FIG. 2 is a block diagram illustrating configurations of a base station 105 and a user equipment 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Self-interference (SI) occurs only in the FDR environment and it should be solved first for efficient operation of the FDR scheme. For the FDR operation, many self-interference cancellation (SIC) schemes have been proposed. Basically, theses SIC schemes are based on the concept of adjusting a difference between magnitudes of power used when a signal is transmitted through a Tx antenna and a background noise of an Rx antenna. For example, in a wireless LAN system (e.g., Wi-Fi), since 20 dBm of transmit power is averagely used and the minimum noise power of a receiving end is about −90 dBm. That is, when a difference therebetween of 110 dBm is eliminated from an SI signal, it is possible to achieve the perfect full duplex operation. Since a transmitted signal is known to a receiving end, the receiving end performs SIC by reconstructing the transmitted signal. However, the SIC can be divided into linear SIC and nonlinear SIC depending on how the reconstruction is performed or which factors are considered.

The linear SIC is performed by subtracting a first-order component of the transmitted signal, which is reconstructed by the receiving end. However, in the receiving end, since the transmitted signal is converted into an analog I/Q signal, changed into a carrier frequency, and then converted into the received signal again, signal distortion occurs. Thus, problems caused by the SI cannot be solved by subtracting the first-order component of the transmitted signal at a digital end. In other words, the nonlinear SIC considering high-order components is required.

The SIC is performed in three steps, and more particularly, antenna, analog, and digital SIC is sequentially performed. The antenna/analog SIC is performed before an analog-to-digital converter (ADC) of the RF end and the digital SIC is performed to cancel SI of a signal that passes through the ADC. In general, since linearity of a reception path is limited, interference portions of an SI signal needs to be eliminated through the antenna and analog SIC as many as possible before the reception path and then the remaining interference portions of the SI signal should be adjusted through the digital SIC in consideration of linear/nonlinear distortion.

Figure 3A:
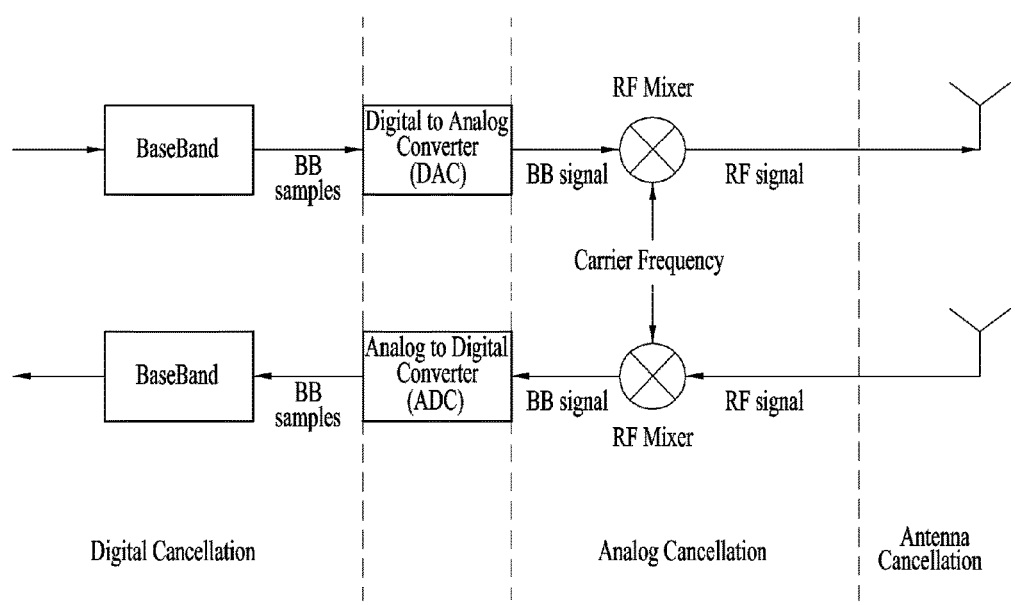
FIG. 3a is a diagram illustrating performance of three self-interference cancellation (SIC) schemes.

FIG. 3a is a diagram illustrating performance of three self-interference cancellation (SIC) schemes.

A signal size capable of passing through an ADC is changed depending on ADC resolution bits. For example, in case of 12 bits of ADC, a signal that is equal to or lower by about 62 dB than a noise floor can be passed. As shown in FIG. 3a, for example, assuming that transmit power is 23 dBm and a noise floor is −96 dBm, the SI should be performed in a receiver ADC dynamic range (DR) only when the following conditions are met. That is, minimum 57 dB of SI including a peak to average power ratio (PAPR) margin of 10 dB should be cancelled in an analog circuit area in order to cancel a residual SI signal without any ADC distortion in a digital circuit area.

However, in the real environment, the SI varies due to changes in the environment (e.g., surrounding environment, transmit power, temperature, etc.) and thus, the analog SIC needs to be sufficiently maintained to handle the variation. To implement such adaptive SIC schemes, a circuit based on a delayer and an attenuator is mainly used.

Figure 3B:
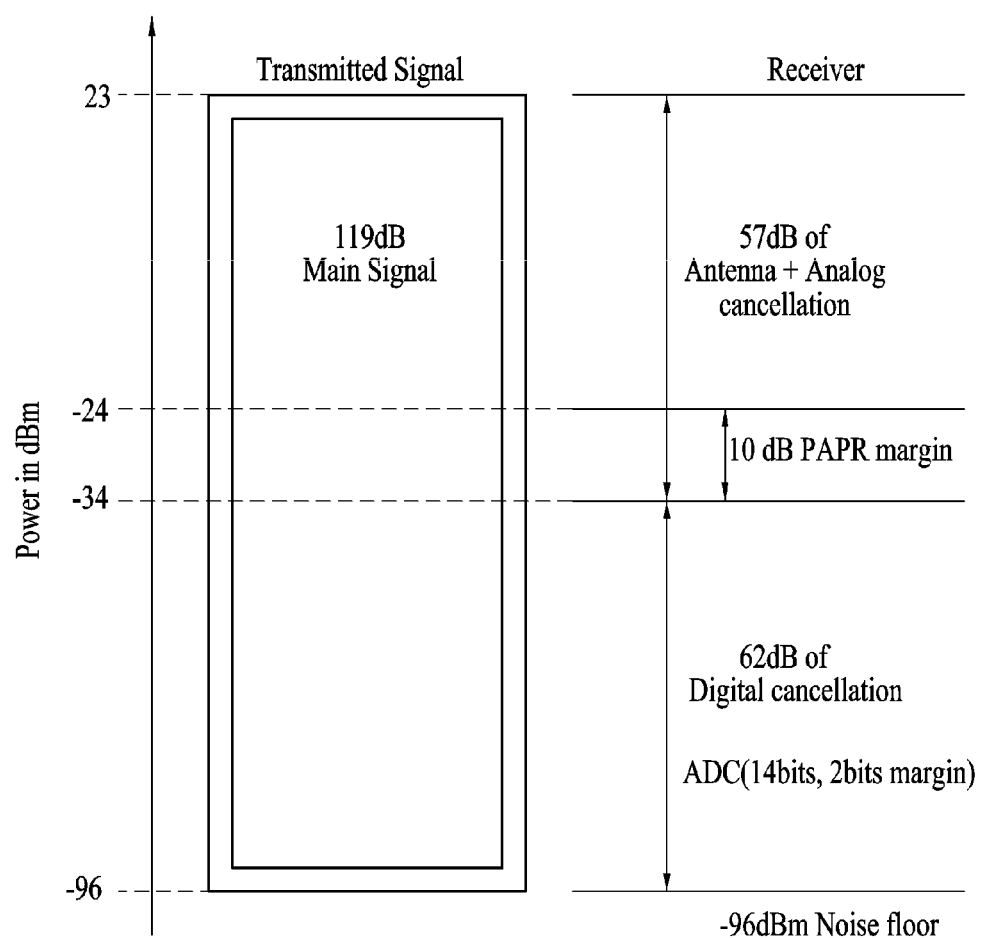
FIG. 3b is a diagram positions where three interference cancellation schemes are applied in an RF end (or RF front end) of an apparatus.

FIG. 3b is a diagram positions where three interference cancellation schemes are applied in an RF end (or RF front end) of an apparatus. Hereinafter, a description will be given of the three SIC schemes in brief.

Antenna SIC: Among all the SIC schemes, the antenna SIC should be preferentially performed. SI is cancelled at an antenna end. Most simply, transmission of an SI signal may be blocked physically by placing a signal-blocking object between a Tx antenna and an Rx antenna, a distance between antennas may be controlled artificially using multiple antennas, or a part of an SI signal may be canceled through phase inversion of a specific transmitted signal. Further, a part of an SI signal may be cancelled by means of multiple polarized antennas or directional antennas.

Analog SIC: Interference is canceled at an analog end before a received signal passes through an Analog-to-Digital Convertor (ADC). An SI signal is canceled using a duplicated analog signal. This may be performed in an RF region or an IF region. SI signal cancellation scheme may be performed in the following specific manner. A duplicate of an actually received SI signal is generated by delaying a transmitted analog signal and controlling the amplitude and phase of the delayed analog signal, and then it is subtracted from a signal received at an Rx antenna. However, due to the analog signal-based processing, implementation complexity and circuit characteristics may cause additional distortion and thus, interference cancellation performance may be significantly degraded.

Digital SIC: Interference is canceled after a received signal passes through an ADC. The digital SIC covers all IC techniques performed in a baseband region. Most simply, a duplicate of an SI signal is generated using a transmitted digital signal and then it is subtracted from a received digital signal. Alternatively, techniques for preventing a signal transmitted from a UE or BS from being received at an RX antenna by performing precoding/postcoding in a baseband using multiple antennas may be considered as the digital SIC. However, considering that the digital SIC is feasible only when a digital signal is quantized to a level enough to recover information of a desired signal, a power difference between the designed signal and the interference signal remaining after interference cancellation based on at least one of the aforementioned schemes should be within an ADC range.

In general, the SIC is performed in three steps, and more particularly, antenna, analog, and digital SIC is sequentially applied. The antenna/analog SIC is performed before an ADC and the digital SIC is performed to cancel SI of a signal that has passed through the ADC.

In this case, if the antenna/analog SIC is not correctly performed, signal distortion may occur due to saturation during the ADC and the digital SIC may not also be performed correctly. Thus, the SI should be decreased such that the signal has a size enough to pass through the ADC.

Figure 4:
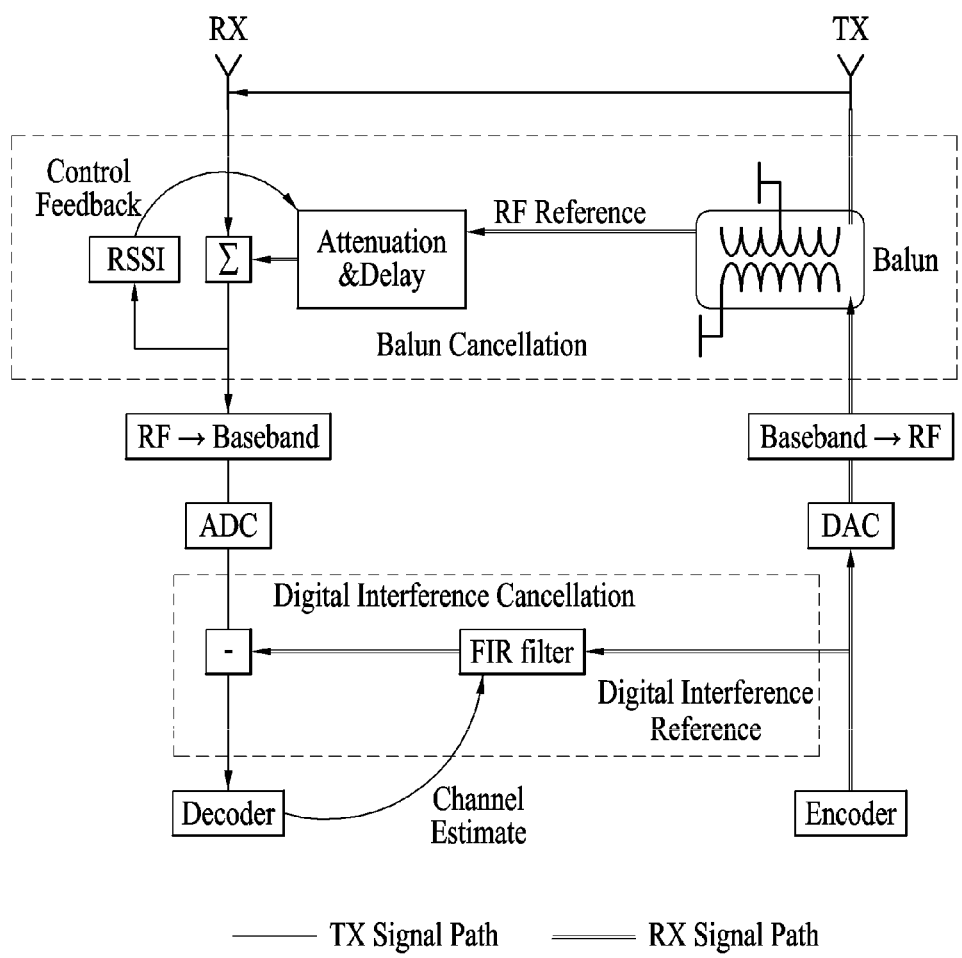
FIG. 4 is a diagram illustrating a balun analog cancellation scheme.

FIG. 4 is a diagram illustrating a balun analog cancellation scheme.

Referring to FIG. 4, for compensation with respect to a radio channel (i.e., SI channel) between Tx and Rx antennas, an SI operation is adaptively performed using a delayer and an attenuator and a gradient descent algorithm is repeatedly used in an analog circuit without control information in a digital domain. Performance of the analog SIC is about −45 dB.

Figure 5:
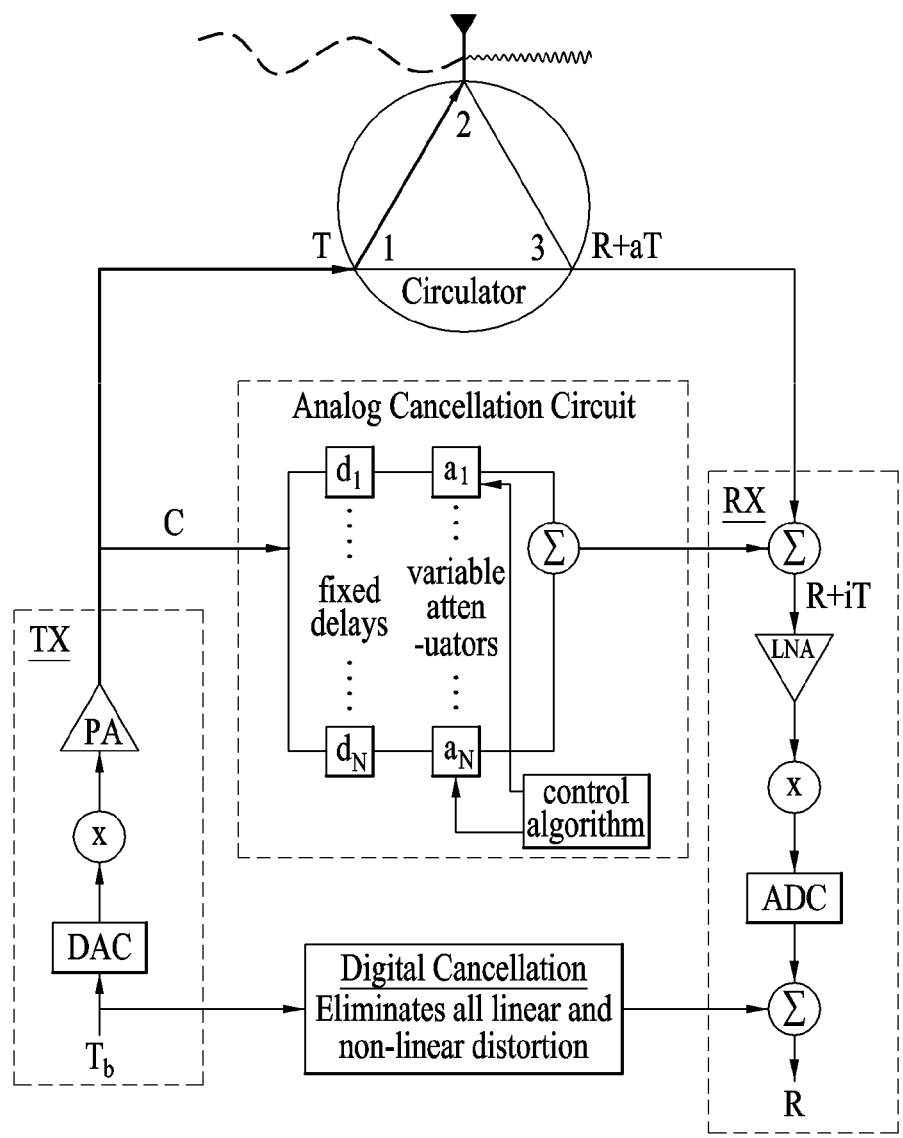
FIG. 5 is a diagram illustrating an analog cancellation scheme including a control algorithm.

FIG. 5 is a diagram illustrating an analog cancellation scheme including a control algorithm.

Referring to FIG. 5, adaptive analog SIC is performed in the following steps. First, a transmitter amplifier output signal is duplicated with a small signal and the duplicated small signal is used as an input for an SIC circuit with multiple taps. This circuit is configured with parallel fixed lines (PFLs) and tunable attenuators and the PFLs are designed to have different lengths so that each line has a different delay. The SI signal is canceled at the analog end by subtracting a signal obtained by combining partial signals passing through these lines and tunable attenuators from a received signal flowing to a receiver. To adjust values of the tunable attenuators, the control algorithm is used. The algorithms can be applied by solving a linear optimization problem using effective channel (e.g., circulator, antenna, etc.) frequency response for distortion where a pilot symbol is used and frequency response for each PFL. In this case, an optimal combination of attenuator values is determined through a full search using combinations of attenuator values for the respective PFLs, which are previously calculated using preambles or reference signals.

Reduction of Stabilization Time of Analog SIC Scheme

Since an analog signal cannot be stored, only one attenuation coefficient value (or delay) can be calculated through one-time transmission of a reference signal. Thus, the SIC satisfying the ADC pass requirements shown in FIG. 2 requires a long stabilization time to use the gradient descent algorithm for cancelling an SI signal. In particular, the gradient descent algorithm may not be suitable for a case in which a new SIC stabilization time is frequently required due to a sudden change in the environment such as a scatter change To generate analog SIC control information at the digital end, the antenna and analog SIC should be performed enough so that a signal can pass through the ADC. However, since there is no initial analog SIC control information, a signal measured using a preamble or reference signal cannot pass through the ADC. Thus, it is impossible to obtain frequency response for distortion and generate the analog SIC control information.

When a calculated or stored value is used to increase an ADC pass probability, the analog end checks whether a signal passes through the ADC by changing transmit power. However, in this case, similar to the above case, there is a problem that only one attenuation coefficient for power is applied during a single analog transmission time. Thus, a scheme for not only configuring an attenuation coefficient value capable of passing through an ADC to generate initial control information but also rapidly changing a configured attenuation coefficient value according to environment changes is required.

The present invention proposes a scheme for rapidly passing through an initial ADC (or a scheme for rapidly stabilizing analog SIC) and a scheme for continuously receiving a desired signal when the initial FDR operation cannot be performed and the previous attenuation coefficient value cannot be used due to environment changes, i.e., when there is no information on an initial attenuation coefficient value for the analog SIC.

For convenience of description, an adaptive SIC scheme where an attenuation coefficient value is changed is used, it is possible to change and use the number of delay lines (or delay circuits) and a phase shifter value as well as the attenuation coefficient value.

Figure 6:
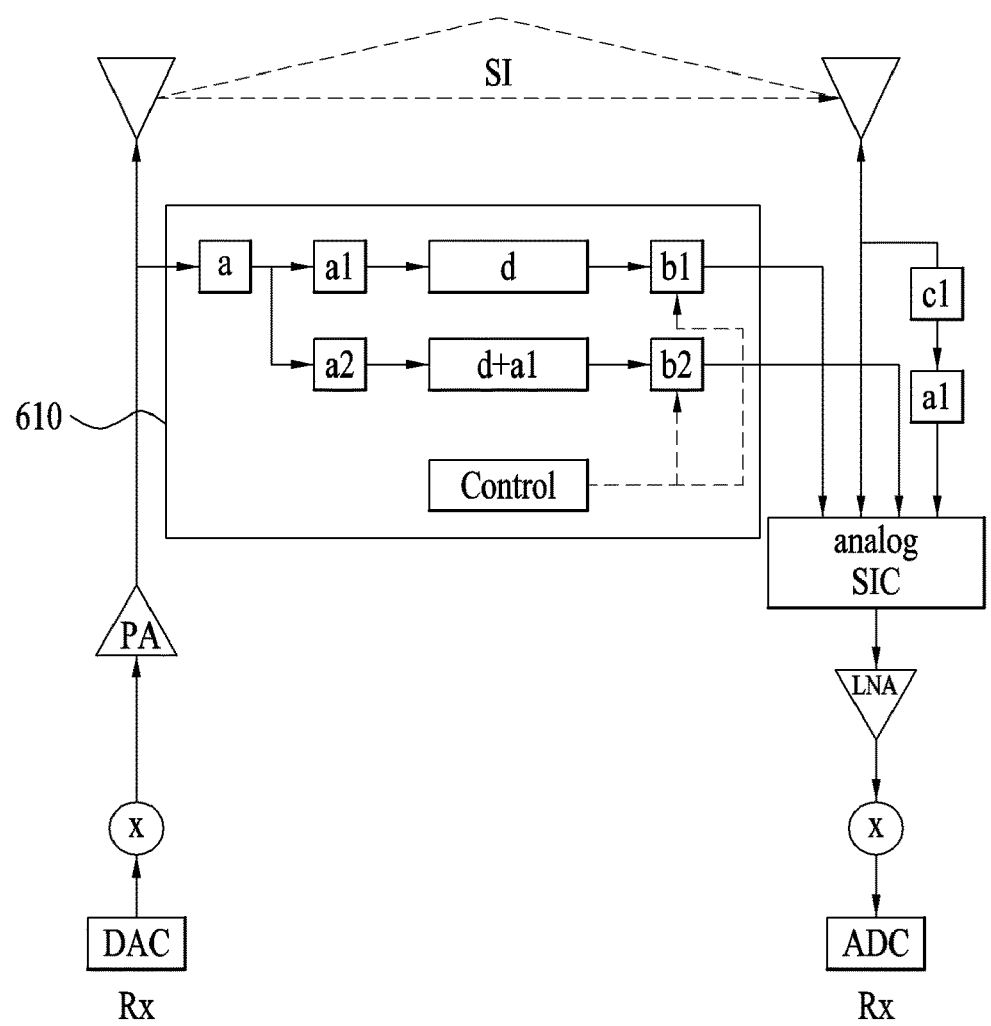
FIG. 6 is a diagram illustrating a circuit configuration for rapidly stabilizing an analog SIC scheme at an initial stage.

FIG. 6 is a diagram illustrating a circuit configuration for rapidly stabilizing an analog SIC scheme at an initial stage.

Referring to FIG. 6, an SI signal is transmitted from a Tx antenna shown in the left of FIG. 6 and then received by an Rx antenna shown in the right of FIG. 6. In this case, the SI signal may include not only a signal directly transmitted and received between antennas but also a signal delayed through a scatterer. In FIG. 6, a circuit 610 can be referred to an analog SI generation unit (or generation circuit) for analog SIC. The analog SI generation unit in FIG. 6 includes a plurality of group delay lines (or circuits).

In FIG. 6, a is a common attenuation coefficient value for respective delay lines. For example, the value a may be an attenuation coefficient value for representing performance of the antenna SIC. In this case, the delay line corresponds to a delay line for reflecting a delay of the signal received at the Rx antenna rather than a delay line having a different delay value in the Tx chain. In delay d and delay d+α1, d indicates a general delay between transmission and reception of an SI signal to perform the analog SIC and α1 indicates a random delay of a received SI signal. Thus, since the delay line reflects a delay in the Rx chain (including the Rx antenna), it may be considered as a group delay line for handling a group of delay lines (in this case, the delay lines may have different delay values) for the analog SIC for the same Rx chain delay. For example, considering the delay in the Rx chain, the delay d can be replaced with the total delay value in the analog cancellation circuit of FIG. 5.

In FIG. 6, a1 and a2 respectively indicate attenuation coefficient values for respective group delay lines and are used to apply attenuation coefficient values for various transmit power similar to the method for changing transmit power to pass through an ADC. In this case, b1 indicates an attenuation coefficient value for an Rx chain delay. For example, b1 indicates each attenuation coefficient value for configured delay lines or calculated or pre-stored attenuation coefficient values. Similar to b1, b2 indicates an attenuation coefficient value for an Rx chain delay and b2 may have a value different from that of b1. The pre-stored or calculated attenuation coefficient values can be checked with b1 through b2. By setting an attenuation coefficient value for the corresponding transmit power, which is different from a first group delay line, to b2 through a combination of a and a2 values, it is possible to reduce a time required for performing the SIC for the transmit power change.

In the Rx chain, α1 is used to cause a delay of α1 to a received signal and c1 may be set to a corresponding value with respect to an attenuation coefficient value for a corresponding delay line d+α1. In addition, α1 may become a maximum value of each device during a time required for performing the analog SIC on a signal passing through a group delay line and an SI received signal or a time required for passing through respective devices from the analog SIC to the ADC. In other words, according to the present invention, a single chain may be established through reuse of the devices from the analog SIC to the ADC.

Meanwhile, if a consecutive transmission interval of the analog signal is smaller than the maximum value of each device during the time required for passing through the respective devices from the analog SIC to the ADC, the devices cannot be reused. Thus, ends including and after the analog SIC of the receiving end in FIG. 5 can be parallelly implemented in FIG. 6. Since the received data can be saved after passing through the ADC, an analog SIC value in each group delay line can be calculated as follows.

If antenna SIC is x dB, c1 can be determined according Equation 1.

$$x+c1=a+a2 \quad \text{[Equation 1]}$$

Similarly, the equation of a+a1=x can be established.

In FIG. 6, it is assumed that a loss caused by inserting Tx and Rx chains can be neglected because the loss is generally smaller than antenna SIC and an attenuation coefficient value. In addition, although FIG. 6 shows an example of two group delay lines, a circuit can be configured with two or more group delay lines. Thus, in a receiving end, $\alpha 1$ and $\alpha 2$ can be extended to $\alpha 1, \alpha 2, \alpha 3, \ldots$, etc. and a1/b1 and a2/b2 can be also extended to a1/b1, a2/b2, a3/b3, ..., etc.

According to the primary method of the present invention, the stabilization time of the SIC can be reduced by dividing delay lines into a plurality of group delay lines (e.g., two group delay lines) as shown in FIG. 6, determining, at a digital end (e.g., ends after the ADC), whether each configured attenuation coefficient value can be used to pass through an ADC, and enabling attenuation coefficient values for at least one delay line to pass through the ADC. For the determination at the digital end, a method of using signal saturation can be used. In this case, method for configuring the attenuation coefficient values can be configured as follows. For convenience of description, assume that attenuation coefficient value a is fixed.

1. Configuration of Attenuation Coefficient Values for the Same Transmit Power (a1=a2)

To rapidly pass through the ADC, pre-stored or calculated attenuation coefficient values are applied to b1 and b2. In this case, b1 and b2 have different values. This can be used when attenuation coefficient values for the initial analog SIC are configured or when the analog SIC is initialized due to failure of the adaptive SIC, which is caused by a sudden environmental change.

2. Configuration of Attenuation Coefficient Values for Different Transmit Power (a1≠a2)

Attenuation coefficient values can be calculated using changed transmit power, for example, an attenuation coefficient value in which changed transmit power is considered can be applied to a first group delay line and an attenuation coefficient value in which transmit power previously used for passing through the ADC is considered can be applied to a second group delay line. In this case, the attenuation coefficient value for the first line may cause failure in passing though the ADC but the attenuation coefficient value for the second line may pass through the ADC (this is because since the latter attenuation coefficient value was previously used in passing through the ADC, the value still has a higher probability of passing through the ADC). Therefore, based on the transmit power applied to the second line, it is possible to recalculate an attenuation coefficient value for transmit power to be changed.

In FIG. 6, when the initial attenuation coefficient value configuration or attenuation coefficient value configuration for updating is completed, an actual signal may be configured not to flow into the second group delay line by setting maximum value of a2.

Depending on whether a received signal including a residual SI signal remaining after the analog SIC for each delay can pass through the ADC, the following operations can be performed.

1. A Case in which Analog SIC for Two Group Delay Lines Fails

In this case, another attenuation coefficient value is applied to corresponding transmit power. Alternatively, the attenuation coefficient value used for previously passing through the ADC is used by changing the transmit power.

2. A Case in which Analog SIC for One Group Delay Line is Successful a. A Case in which Two Different Coefficient Values are Configured for the Same Transmit Power When the two different coefficient values are configured for the same transmit power, the analog SIC is performed using an attenuation coefficient value which can pass through the ADC.

b. A Case in which Different Transmit Power is Used (when Attenuation Coefficient Values for the Initial Analog SIC are Configured)

For example, it is assumed that the attenuation coefficient value reflecting the changed transmit power is applied to the first group delay line and the attenuation coefficient value reflecting the transmit power previously used for passing through the ADC is applied to the second group delay line. If the analog SIC for the first group delay line is successful, it is possible to use the attenuation coefficient value for the first group delay line without using the attenuation coefficient value applied to the second line. The attenuation coefficient value for the first group delay may be used in an update process for the analog SIC or transmit power change. On the other hand, if the analog SIC for the second group delay line is successful, the attenuation coefficient value needs to be recalculated according to transmit power change.

c. A Case in which an Update is Performed

While attenuation coefficient values are updated for the adaptive SIC, it can be assumed that a desired signal is transmitted from a UE unlike the attenuation coefficient value configuration for initial analog SIC. In this case, if the attenuation coefficient values for the adaptive SIC operation are not correctly updated, the desired signal cannot be restored due to failure in passing the ADC. Thus, if the attenuation coefficient value reflecting the changed transmit power is applied to the first group delay line and the attenuation coefficient value reflecting the transmit power previously used for passing through the ADC is applied to the second group delay line, it is possible to pass through the ADC owing to the previous successful attenuation coefficient value even though there is failure in the first line due to the update failure. In this case, although performance of the desired signal is slightly degraded due to flow of the received signal in the reception chain, a probability of restoring the desired signal can be enhanced.

3. A Case in which Analog SIC for Two Group Delay Lines is Successful

In the case of the attenuation coefficient configuration for the initial analog SIC, two attenuation coefficient values can be used. A desired signal is considered during the update, received data can be stored after passing through the ADC, received signals can be combined through maximum ratio combining (MRC) after the analog SIC is performed on each of the two lines. By doing so, the desired signal can be restored without any performance degradation.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

An apparatus for performing SIC in an environment supporting in an environment supporting an FDR scheme can be industrially applied to various wireless communication systems such as the 3GPP LTE/LTE-A system, 5G system, and the like.

What is claimed is:

1. A communication apparatus for performing self-interference cancellation (SIC) in an environment supporting a full duplex radio (FDR) scheme, the communication apparatus comprising:
 a transmitter configured to transmit a reference signal (RS) with a first transmission power, the first transmission power being different from a second transmission power used for transmission of a previous RS;
 an analog self-interference (SI) canceller circuit;
 an SI signal generator circuit configured to:
  generate a first SI signal by applying a first attenuation coefficient to transmit the first SI signal to the analog SI canceller circuit from a first delay circuit connected between radio frequency (RF) transmission and reception chains of the communication apparatus, and
  generate a second SI signal by applying a second attenuation coefficient to transmit the second SI signal to the analog SI canceller circuit from a second delay circuit connected between the RF transmission and reception chains of the communication apparatus,
 wherein the first attenuation coefficient is determined based on the first transmission power of the RS,
 wherein the second attenuation coefficient is determined based on the second transmission power used for transmission of the previous RS, and
 wherein the analog SI canceller circuit is configured to:
  perform a first analog SIC by subtracting the first SI signal from an SI signal received at the RF reception chain from a reception antenna, and
  perform a second analog SIC by subtracting the second SI signal from the SI signal; and
 a processor configured to determine whether the first analog SIC is successful based on a residual SI signal remaining after performing the first analog SIC and determine whether the second analog SIC is successful based on a residual SI signal remaining after performing the second analog SIC.

2. The communication apparatus of claim 1, wherein when it is determined that the first SIC is successful and the second analog SIC fails, the SI signal generator circuit is configured to update an attenuation coefficient for the second analog SIC to the first attenuation coefficient.

3. The communication apparatus of claim 1, wherein when it is determined that the first SIC fails and the second analog SIC is successful, the SI signal generator circuit is configured to discard the first attenuation coefficient and re-determine a new attenuation coefficient for the first analog SIC.

4. The communication apparatus of claim 1, wherein the SI signal generator circuit comprises the first and second delay circuits, and
 wherein each of the first and second delay circuits comprises a first attenuator for the applying the first attenuation coefficient and a second attenuator for the applying the second attenuation coefficient.

5. The communication apparatus of claim 4, wherein each of the first and second delay circuits further comprises a first delayer for applying a first delay value and a second delayer for applying a second delay value.

6. The communication apparatus of claim 1, wherein the SI signal generator circuit comprises the first and second delay circuits, and
 wherein each of the first and second delay circuits is connected in parallel to the RF transmission and reception chains.

7. The communication apparatus of claim 5, wherein each of the first delay value and the second delay value corresponds to delays at the RF reception chain.

8. A method for performing self-interference cancellation (SIC) by a communication apparatus operating in a full duplex radio (FDR) scheme, the method comprising:
 transmitting a reference signal (RS) with a first transmission power, the first transmission power being different from a second transmission power used for transmission of a previous RS;
 generating a first self-interference (SI) signal by applying a first attenuation coefficient to transmit the first SI signal to an analog SI canceller from a first delay circuit connected between radio frequency (RF) transmission and reception chains of the communication apparatus;
 generating a second SI signal by applying a second attenuation coefficient to transmit the second SI signal to the analog SI canceller from a second delay circuit connected between the RF transmission and reception chains of the communication apparatus,
 wherein the first attenuation coefficient is determined based on the first transmission power of the RS, and
 wherein the second attenuation coefficient is determined based on the second transmission power used for transmission of the previous RS;
 performing a first analog SIC by subtracting the first SI signal from an SI signal received at the RF reception chain from a reception antenna;
 performing a second analog SIC by subtracting the second SI signal from the SI signal; and determining whether the first analog SIC is successful based on a residual SI signal remaining after performing the first analog SIC and whether the second analog SIC is successful based on a residual SI signal remaining after performing the second analog SIC.

9. The method of claim 8, wherein when it is determined that the first SIC is successful and the second analog SIC fails, updating an attenuation coefficient for the second analog SIC to the first attenuation coefficient.

10. The method of claim 8, wherein when it is determined that the first SIC fails and the second analog SIC is successful, discarding the first attenuation coefficient and re-determining a new attenuation coefficient for the first analog SIC.

11. The method of claim 8, wherein each of the first and second delay circuits is connected in parallel to the RF transmission and reception chains.

* * * * *